United States Patent [19]

Varkia

[11] Patent Number: 4,499,763
[45] Date of Patent: Feb. 19, 1985

[54] MEANS FOR ATTACHING A SOUNDING BALLOON

[75] Inventor: Esa Varkia, Espoo, Finland

[73] Assignee: Vaisala Oy, Finland

[21] Appl. No.: 537,936

[22] Filed: Sep. 30, 1983

[30] Foreign Application Priority Data

Jun. 13, 1983 [FI] Finland ............................. 832316

[51] Int. Cl.³ .............................................. G01W 1/00
[52] U.S. Cl. .................................. 73/170 R; 403/211;
116/DIG. 9; 24/30.5 L
[58] Field of Search ........... 24/30.5 L, 30.5 S, 30.5 R;
403/211; 73/170 R; 116/210, DIG. 9; 383/78,
82, 83, 85, 89, 68, 13

[56] References Cited

U.S. PATENT DOCUMENTS 3,002,240 10/1961 Laguerre ......................... 24/30.5 L
3,036,506 5/1962 Andresen, Jr. ................... 24/30.5 X
3,309,742 3/1967 Chin ................................. 24/30.5 L
3,766,610 10/1973 Thorsbakkeu ...................... 403/211
4,056,000 11/1977 Kulhauek ........................ 73/170 R Primary Examiner—Andrew V. Kundrat
Attorney, Agent, or Firm—Steinberg & Raskin

[57] ABSTRACT

Apparatus for attaching a sounding balloon by its filling tube to a device which is adapted to be connected to a radiosonde by a flexible connecting element includes an attachment member in which an aperture is formed and a fixing member adapted to be fitted in locking position on the attachment member so that at least a portion thereof extends through the aperture. The fixing member includes at least one wedge-shaped portion which extends through the aperture of the attachment member when the fixing member is fitted into locking position to urge the filling tube of the sounding balloon against the marginal edge of the aperture to fix the filling tube and, therefore, the sounding balloon to the attachment member. The attachment member preferably is integral with a plate body which widens in a downward direction and which constitutes a device for releasing the flexible connecting element between the radiosonde and the sounding balloon in a controlled manner.

15 Claims, 7 Drawing Figures

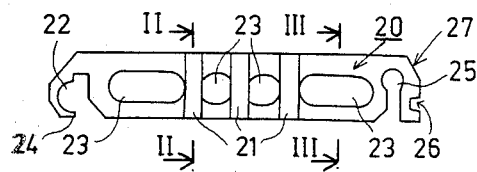
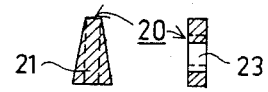
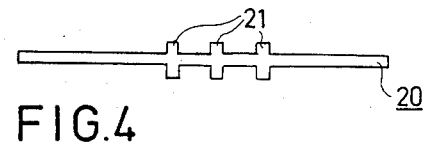
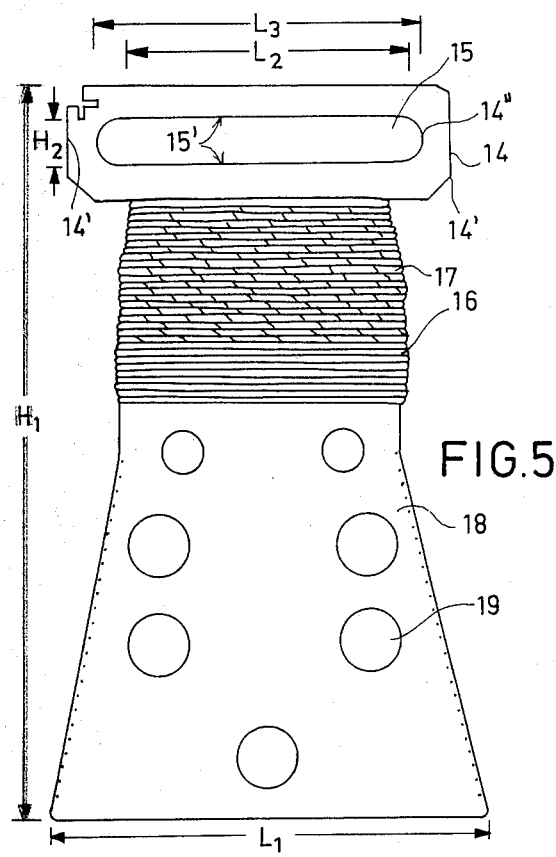
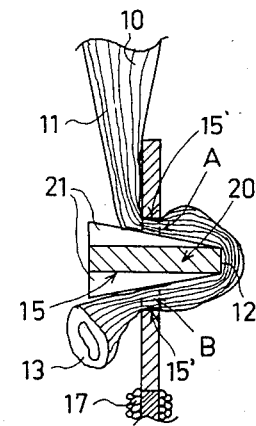
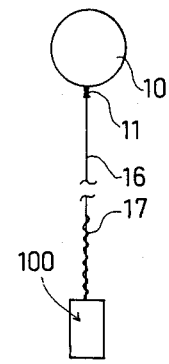

MEANS FOR ATTACHING A SOUNDING BALLOON

BACKGROUND OF THE INVENTION

This invention relates to apparatus for attaching a sounding balloon to a device which is adapted to be connected to a radiosonde by a flexible connecting element.

Meteorological or other similar radiosondes are lifted aloft by so-called sounding balloons which are filled with a lighter-than-air gas. As the sounding balloon ascends, the atmospheric conditions in the regions trailing the path of the ascending balloon change to at least some degree and for this reason it is customary to suspend the radiosonde from the sounding balloon by a relatively long flexible connecting element, such as a string, the length of which may be, for example, about 50 m. In this manner, any changes in the meteorological conditions caused by the ascending sounding balloon will not be detected by the radiosonde which has been situated a sufficient distance from the balloon to allow steady state atmospheric conditions to return.

Since the sounding balloon and the sounding apparatus must be released to rise simultaneously, it has been conventional to affix below the balloon mechanical means such, for example, as a pendulum mechanism or a friction brake, which allows the flexible connecting element to be payed out or discharged at a certain rate from a reel under the balloon. Such mechanical means have relatively complicated constructions and are therefore relatively expensive. However, since this equipment is disposable, it will be understood that it is of importance to be able to provide means for controllably releasing the flexible connecting element which is relatively simple in construction yet reliable in operation.

In applicant's Finnish publicizing print no. 64 013, a means for releasing the flexible connecting element attachable to a sounding balloon is disclosed which is simple in construction but which insures positive and uniform release of the connecting element. The releasing means comprises a plate-like body attachable to the sounding balloon and on which the connecting element is wound.

In using the connecting element release means disclosed in Finnish publicizing print no. 64 013, the filling tube of the sounding balloon is fixed within a slot provided at the upper end of the plate-like body whereupon the filling tube is folded back against itself and tied closed by a string. However, this arrangement has the drawback that the attaching and tube closing operations are quite time consuming and a reliable attachment of the releasing means to the sounding balloon is not always achieved, especially since the sizes of sounding balloons and the diameters of the filling tubes thereof vary over a relatively large range. Although it would be possible to use different releasing means for sounding balloons of different sizes and for filling tubes of different diameters, this will of course involve increased costs.

It is also known to use separate shut-off valves in the filling tubes of sounding balloons. However, the use of such separate shut-off valves is costly in view of the disposable nature of the apparatus.

SUMMARY OF THE INVENTION

Accordingly, one object of the present invention is to provide new and improved apparatus for reliably attaching a sounding balloon by its filling tube to a device which is adapted to be connected to a radiosonde by a flexible connecting element.

Another object of the present invention is to provide a new and improved sounding balloon attachment apparatus of the type described above and which further reliably hermetically closes the filling tube of the sounding balloon.

Still another object of the present invention is to provide new and improved apparatus for reliably attaching a sounding balloon and for reliably closing the filling tube thereof and which, additionally, is suited for use in connection with sounding balloons of different sizes and having filling tubes of different diameters.

Briefly, in accordance with the present invention, these and other objects are attained by providing apparatus including an attachment member having an aperture formed therethrough and a fixing member adapted to be fitted in locking position on the attachment member. The fixing member includes at least one wedge-shaped portion which extends through the aperture of the attachment member when the fixing member is fitted into the locking position so as to wedge the filling tube of the sounding balloon to form a substantially U-shaped bight against regions of the marginal edge of the aperture to thereby fix the filling tube to the attachment member.

DETAILED DESCRIPTION OF THE DRAWINGS

A more complete appreciation of the present invention and many of the attendant advantages thereof will be readily understood by reference to the following detailed description when considered in connection with the accompanying drawings in which:

FIG. 1 is a side elevation view of a fixing member comprising a component of the present invention;

FIG. 2 is a section line taken along line II—II of FIG. 1;

FIG. 3 is a section view taken along line III—III of FIG. 1;

FIG. 4 is a top plan view of the attachment member illustrated in FIG. 1;

FIG. 5 is a side elevation view of an attachment member forming a component of the apparatus of the present invention, the attachment member being integrally formed with a connecting element release means and further illustrating the flexible connecting element wound around the release means;

FIG. 6 is a section view illustrating the fixing member fitted in its locking position on the attachment member thereby fixing and closing the filling tube of the sounding balloon to the attachment member; and FIG. 7 is a schematic illustration of a sounding balloon from which a radiosonde is suspended from a flexible connecting element which itself is connected to apparatus in accordance with the present invention.

DESCRIPTION OF THE PREFERRED EMBODIMENTS

Referring now to the drawings wherein like reference characters designate identical or corresponding parts throughout the several views, and more particularly to FIG. 5, an attachment member 14 forming a component of the present invention is illustrated. In the illustrated embodiment, the attachment member 14 is integrally connected to the upper end of a plate body 18 which widens in a downward direction and which constitutes a means for releasing the flexible connecting element 16 between the radiosonde and the sounding balloon in a controlled manner as the sounding balloon ascends in the atmosphere. The attachment member 14 has an aperture 15 formed therethrough, the aperture being substantially elongated and defined by a marginal edge, the opposing long regions of the marginal edge being designated 15'.

The plate body 18 is illustrated in FIG. 5 in substantially full size. For example, the length $H_1$ is about 15 cm, the breadth $L_1$ of the lower wide end of the plate body 18 is about 9 cm and the breadth $L_2$ of the upper end of the plate body is about 5.5 cm. The plate body 18 is formed of any suitable material such, for example, as plastic, cardboard or the like and its thickness is about 1-1.5 mm so that the plate body 18 is sufficiently rigid in its thickness direction. Weight-reducing holes 19 are formed through the plate body 18.

The flexible connecting element 16 is wound around the plate body 18 and an antenna wire 17 is helically wound around the flexible connecting element 16. The end of the flexible connecting element 16 is attached to the radiosonde 100 (FIG. 7).

Referring to FIGS. 1-4, a fixing body 20 is designed so as to be fitted in a locking position (as seen in FIG. 6) on the attachment member 14. The fixing member 20 has a plurality, in this case three, wedge-shaped portions 21 formed centrally thereon and which are adapted to extend through the aperture 15 of the attachment member 14 when the fixing member 20 is fitted in locking position on the attachment member. A plurality of weight-reducing holes 23 are formed through the fixing member 20. It is understood that although three wedge-shaped portions 21 situated in side-by-side relationship are illustrated in the preferred embodiment, the number of wedge-shaped portions may be greater or smaller than three.

The fixing member 20 has a notch 22 formed at one of its ends, the opening of the notch 22 being closed to some degree by the projection 24. The notch 22 is adapted to be coupled to a land 14' of the aperture 15 in the attachment member 14 so that upon such coupling, the fixing member 20 can be swiveled to enter the aperture 15. A bevelled surface 27 is formed on the other end of the fixing member 20 and functions to guide the fixing member 20 into the locking position within the aperture 15 of the attachment member 14. A locking notch 26 is formed in the same side of the fixing member 20 in which the bevelled surface 27 is formed, the locking notch 26 adapted to receive a region of the marginal edge of the aperture 15 when the fixing member 20 is fitted in its locking position. Thus, the notch 26 constitutes locking means for securing the fixing member 20 in the locking position on the attachment member. Moreover, a notch 25 is formed in the fixing member 20 so that the portion of the fixing member in which the locking notch 26 is formed is adapted to move resiliently to a retracted position as the fixing member is fitted into the locking position whereupon that portion will then resiliently snap back or return to its original position when the locking notch 26 is aligned with the thickness of the attachment member to receive the region 14" of the marginal edge of aperture 15.

The attachment member 14 and the aperture 15 are so dimensioned that the breadth $L_3$ of aperture 15 is several times the height $H_2$ of the aperture and so that the breadth of the attachment member 14 preferably equals the breadth $L_1$ of the lower end of the plate body 18.

Referring now to FIG. 6, the fixing member 20 is shown in its locking position within the aperture 15 of the attachment member 14 with the filling tube 11 of the sounding balloon 10 being thereby fixed to the attachment member 14 and hermetically closed. This attachment is accomplished as follows. The notch 22 of the fixing member 20 is coupled to the land 14' whereupon the outer part 12 of the filling tube 11 is placed against the attachment member 14 so as to extend over the aperture 15. The fixing member 20 is then swiveled around the pivot created by the coupling of the notch 22 and land 14' whereupon the outer part 12 of the filling tube becomes wedged between the parallel long regions 15' of the marginal edge of the aperture 15 and the side edges of the wedge-shaped portions 21. In this manner, the outer part 12 of the filling tube 11 is clamped at points designated A and B so that not only is the filling tube 11 reliably fixed to the attachment member 14 but, additionally, the filling tube 11 is hermetically closed.

In the final step of the attachment operation, the notch 26 of the fixing member 20 snaps fast to the region 14" of the marginal edge of aperture 15. Since the breadth $L_3$ of aperture 15 of the attachment member 14 is dimensioned sufficiently large while the fixing member 20 is provided with wedge-shaped portions 21 whose thicknesses increase from very small to quite large, it is possible by the arrangement of the invention to fix and hermetically close filling tubes 11 having diameters which vary over relatively wide ranges. The outer end 13 of the filling tube 11 is located outside of the attachment member 20 as best seen in FIG. 6.

The means for releasing the flexible connecting element extending between the radiosonde 100 and the sounding balloon operates as follows. With the flexible connecting element 16 wound in reel form around the plate body 18 as shown in FIG. 5, and with its ends connected to the attachment member and radiosonde 100 respectively, the sounding balloon 10 is released to ascend into the atmosphere with the radiosonde being positioned immediately beneath the releasing means. The flexible connecting element 16 begins to unwind from the plate body 18 and at the same time swings periodically back and forth under the sounding balloon 10. In this manner, the connecting element 16 is unwound without tangling and at an appropriate rate. As the flexible connecting element 16 unwinds, the plate body 18 is caused to swing in a periodic manner, the periodic swinging constituting a damped oscillation which derives its energy from the gravity-induced increase of the distance between the radiosonde 100 and the balloon 10. The flexible connecting element 16 eventually completely unwinds from the plate body at which point the distance between the balloon 10 and the radiosonde 100 may, for example, be about 50 m. Since the end of the flexible connecting element 16 is affixed to the plate body 18, the radiosonde 100 will be maintained at a constant distance from the balloon 10 as the latter continues to rise.

Care should be taken in the fixing of the filling tube 11 that the plate body 18, or equivalent thereof, is fixed in a relatively rigid manner to the filling tube of the balloon 10 in order to produce a proper degree of resistance to the oscillatory motion of the plate body 18 thereby insuring that the connecting element 16 will not unwind too rapidly.

Obviously, numerous modifications and variations of the present invention are possible within the light of the above teachings. For example, it is not essential that the means for releasing the connecting element in a controlled manner be constituted by a plate body of the type described herein. Thus, the releasing means may be constituted by a cylindrical body or by any mechanical means whereby the connecting element is released in an appropriate manner. Other variations can be made in the particular configurations of the various elements disclosed herein. Therefore, it is understood that within the scope of the claims appended hereto, the invention may be practiced otherwise than as specifically disclosed herein.

What is claimed is:

1. In a combination including a sounding balloon having a filling tube, a payload, such as a radiosonde, to be carried by the sounding balloon, a flexible connecting element having one end connected to the payload, and means for attaching the other end of the flexible connecting element to the sounding baloon, the improvement wherein the attaching means comprises:
    an attachment member having an aperture formed therethrough, said aperture being defined by a marginal edge; and
    a fixing member adapted to be fitted in locking position on said attachment member with at least a portion thereof extending through said aperture, said fixing member including means for urging the filling tube of the sounding balloon against a region of said marginal edge of said aperture when said fixing member is fitted on said attachment member to fix the filling tube to said attachment member.

2. The combination of claim 1 wherein said urging means of said fixing member include at least one wedge-shaped portion which extends through said aperture when said fixing member is fitted into said locking position, each said wedge-shaped portion having at least one side edge which urges the filling tube of the sounding balloon against the region of said marginal edge of said aperture when said fixing member is fitted on said attachment member.

3. The combination of claim 2 wherein said wedge-shaped portion urges the filling tube of the sounding balloon to lie in a substantially U-shaped bight against opposed regions of said marginal edge of said aperture when said fixing member is fitted on said attachment member.

4. The combination of claim 2 wherein said urging means of said fixing member also hermetically closes the filling tube at the same time as said means fixes the filling tube to said attachment member.

5. The combination of claim 2 wherein said aperture of said attachment member is elongated, the breadth of said aperture being several times as large as its height, and wherein the marginal edge of said aperture has mutually opposed, substantially parallel regions, and wherein said attachment includes lands situated proximate to shorter marginal edge regions of said aperture.

6. Apparatus for attaching a sounding balloon by its filling tube to a device which is adapted to be connected to a radiosonde by a flexible connecting element, comprising:
    an attachment member having an elongated aperture formed therethrough, said aperture being defined by a marginal edge, the breadth of said aperture being several times as large as its height, and wherein the marginal edge of said aperture has mutually opposed, substantially parallel regions, and wherein said attachment member includes lands situated proximate to shorter marginal edge regions of said aperture;
    a fixing member adapted to be fitted in locking position on said attachment member with at least a portion thereof extending through said aperture, said fixing member including means for urging the filling tube of the sounding balloon against a region of said marginal edge of said aperture when said fixing member is fitted on said attachment member to fix the filling tube to said attachment member, said fixing member having an elongated configuration, the length of said fixing member corresponding to the breadth of said attachment member, said fixing member including a notch at one of its ends adapted to be coupled to one of said lands of said attachment member, and said fixing member including locking means at the other of its ends for securing said fixing member in said locking position on said attachment member, and
    wherein said urging means of said fixing member include at least one wedge-shaped portion which extends through said aperture when said fixing member is fitted into said locking position, each said wedge-shaped portion having at least one side edge which urges the filling tube of the sounding balloon against the region of said marginal edge of said aperture when said fixing member is fitted on said attachment member.

7. The combination of claim 6 wherein said locking means comprise a notch provided in said other end of said fixing member adapted to receive a region of the marginal edge of said aperture.

8. The combination of claim 7 wherein said locking notch is formed on a portion of said fixing member which is adapted to resiliently move to a retracted position as said fixing member is fitted into said locking position and resiliently return to its original position when said fixing member reaches said locking position to receive a region of the marginal edge of said aperture.

9. The combination of claim 7 wherein said other end of said fixing member on which said notch is provided is also provided with a bevelled surface for guiding said fixing member into said locking position.

10. The combination of claim 6 wherein each of said at least one wedge-shaped portions is situated in a central region of said fixing member and includes a pair of said side edges which taper towards each other, each of said side edges urging the filling tube of the sounding balloon against opposed regions of said marginal edge of said aperture of said attachment member.

11. The combination of claim 10 wherein said at least one wedge-shaped portion includes a plurality of wedge-shaped portions situated in side-by-side relationship.

12. Apparatus for attaching a sounding balloon by its filling tube to a device which is adapted to be connected to a radiosonde by a flexible connecting element, comprising:
    an attachment member having an aperture formed therethrough, said aperture being defined by a marginal edge, said attachment member being integrally connected with means for releasing the flexible connecting element extending between the radiosonde and the sounding balloon in a controlled manner;

a fixing member adapted to be fitted in locking position on said attachment member with at least a portion thereof extending through said aperture, said fixing member including means for urging the filling tube of the sounding balloon against a region of said marginal edge of said aperture when said fixing member is fitted on said attachment member to fix the filling tube to said attachment member, and wherein said urging means of said fixing member include at least one wedge-shaped portion which extends through said aperture when said fixing member is fitted into said locking position, each said wedge-shaped portion having at least one side edge which urges the filling tube of the sounding balloon against the region of said marginal edge of said aperture when said fixing member is fitted on said attachment member.

13. The combination of claim 12 wherein said attachment member has a plate-shaped configuration and wherein said releasing means comprises a plate body which widens in a downward direction, the connecting element adapted to be wound on said plate body, said attachment member being situated at an upper edge of said plate body.

14. The combination of claim 13 wherein the breadth of said fixing member is substantially equal to the breadth of a lower end of said plate body on which the flexible connecting element is adapted to be wound.

15. Apparatus for attaching a sounding balloon by its filling tube to a device which is adapted to be connected to a radiosonde by a flexible connecting element, comprising:

an attachment member having an aperture formed therethrough, said aperture being defined by a marginal edge, said attachment member being integrally connected with means for releasing the flexible connecting element extending between the radiosonde and the sounding balloon in a controlled manner; and a fixing member adapted to be fitted in locking position on said attachment member with at least a portion thereof extending through said aperture, said fixing member including means for urging the filling tube of the sounding balloon against a region of said marginal edge of said aperture when said fixing member is fitted on said attachment member to fix the filling tube to said attachment member.

* * * * *